United States Patent [19]

Robinbrosse et al.

[11] Patent Number: 5,024,878
[45] Date of Patent: Jun. 18, 1991

[54] COMPOSITE MATERIAL WITH ZIRCONIA MATRIX

[75] Inventors: Christian Robinbrosse, Le Haillan; Roger Naslain, Pessac; Jacky Minet; Francis Langlais, both of Gradignan, all of France

[73] Assignee: Societe Europeenne de Propulsion, Suresnes, France

[21] Appl. No.: 409,510

[22] Filed: Aug. 28, 1989

[30] Foreign Application Priority Data

Sep. 14, 1988 [FR] France ................................ 88 12000

[51] Int. Cl.⁵ ................................................ G32G 5/06
[52] U.S. Cl. ................................... 428/297; 428/361; 428/366; 428/367; 428/389; 428/408; 428/698
[58] Field of Search ................ 428/297, 361, 366, 367, 428/389, 408, 698

[56] References Cited

U.S. PATENT DOCUMENTS 4,324,893  4/1982  Brennan et al. .................... 428/107
4,507,224  3/1985  Toibaya et al. ...................... 501/88
4,642,271  2/1987  Rice ..................................... 428/378
4,752,503  6/1988  Thebault ............................ 427/249

Primary Examiner—Stephen J. Lechert, Jr.
Attorney, Agent, or Firm—Bacon & Thomas

[57] ABSTRACT

The material is formed by a fibrous reinforcement constituted by a texture of carbon or silicon carbide fibers and a matrix deposited by chemical vapor infiltration through the porosity of the fibrous fabric and containing free carbon co-deposited with the zirconia, the weight proportion of free carbon co-deposited with the zirconia in the matrix being preferably between 0.1 and 10%. In comparison with pure or partly stabilized fritted zirconias, the composite zirconia according to the invention exhibits an improved tenacity, preservation of the mechanical strength and dimensional stability under high temperatures, as well as an improved density, without the introduction of the fibrous reinforcement reducing too excessively the properties of heat insulation and resistance to oxidation.

4 Claims, 4 Drawing Sheets

COMPOSITE MATERIAL WITH ZIRCONIA MATRIX

The present invention relates to a composite material with zirconia matrix, and more specifically to a composite material having a fibrous reinforcement and a zirconia matrix deposited by chemical vapor infiltration through the porosity of the reinforcement.

Zirconia, $ZrO_2$, s a highly refractory oxide exhibiting high chemical inertia and, in certain forms at least, high mechanical strength. Furthermore, and contrary to alumina, zirconia is a material which is characterised by low heat conductivity, a property which makes it an excellent heat insulating material. However, despite the aforesaid advantages, the applications of pure zirconia are limited by the existence of a complex polymorphism, and by excessively high thermal expansion coefficient and density. This is why the allotropic transformation which occurs between the monoclinic variety $ZrO_2$ (m), stable at room temperature, and the quadratic variety $ZrO_2$ (q), around 1100° C. during heating and around 850° C. during cooling, is incompatible with most applications because of its high-explosive nature due to the attendant variation of volume and to its quasi-instantaneous character.

In order to overcome these drawbacks, the aim has been to try and stabilize zirconia by mixing it with other refractory oxides such as lime, magnesium oxide or yttrium oxide. Depending on the quantity of stabilizing oxide which is added, zirconia may be either totally stabilized in cubic form (fluorite type structure) or partly stabilized in the form of a mixture of cubic and quadratic forms. It has also been shown that the quadratic form could be preserved at room temperature provided that its size grading is brought to the micrometric or sub-micrometric scale. On those bases, zirconia ceramics have been developed which were found to perform extremely well in terms of breaking strength and, to a lesser extent, of tenacity. Nonetheless, in the first place, the development of such ceramics is delicate (inasmuch as it requires the use of powders which are difficult to produce) and secondly, the improvement of the mechanical properties, although being effective at room temperature, tends to reduce gradually when nearing the allotropic transformation temperature. In view of the foregoing, it appears that the presently known zirconia ceramics are not absolutely satisfactory for applications under load at high temperatures.

It is therefore the object of the invention to propose a zirconia ceramics with improved properties, particularly regarding tenacity, dimensional stability under high temperatures, and density.

This object is reached with a composite material having a zirconia matrix in which the reinforcement is constituted by a fibrous texture made up of fibers selected from carbon fibers and silicon carbide fibers and a matrix containing free carbon co-deposited with the zirconia.

The reinforcement fibers may be coated with an intermediate layer in a material such as laminar pyrolytic carbon or boron nitride, which is elastically deformable at least under shear stress, which has a breaking elongation greater than that of zirconia and which adheres to the reinforcing fibers as well as to the matrix, thereby forming between the reinforcing fibers and the matrix, an intermediate bonding layer showing elastic properties at least under shear stress. The formation of such intermediate layer is known per se, for example from French patent FR 84 11 591. The thickness of the intermediate layer is between 10 nm and 5 μm, and preferably between 100 nm and 5 μm.

The use of carbon or silicon carbide fibers contributes to improving the mechanical strength of the material, owing to the mechanical properties inherent to these fibers, especially at high temperatures. It should be noted on this point that this is not so when refractory fibers in oxides such as alumina or zirconia are used as described in European Patent EP 0 085 601, because in spite of the very high melting point of these fibers, their mechanical properties have a tendency to diminish at high temperature.

The formation of the matrix by co-deposition of zirconia and free carbon has proved particularly advantageous.

Primarily, an excessive amount of carbon in the gas mixture used for depositing the matrix by chemical vapor infiltration reduces the aggressivity of the mixture towards the fibrous reinforcement by moderating its oxidizing power. Typically, the gas mixture is constituted by the combination $ZrCl_4$-$CO_2$-$H_2$ diluted in a rare gas such as argon, the zirconium tetrachloride being for example obtained by reacting chlorine $Cl_2$ with zirconium overheated in a chlorinator immediately before being mixed with the other gases. The free carbon co-deposition is obtained by a relative proportion of $CO_2$ higher than that which is strictly required in the mixture in order to obtain a matrix of pure zirconia. The conditions for obtaining a matrix of pure zirconia by chemical vapor infiltration are described in the aforecited patent EP 085 601. These conditions have been modified in the present case, as far as the proportions of the g as mixture constitutents are concerned, in order to obtain a co-deposition of zirconia and free carbon with a weight proportion of free carbon in the matrix varying preferably between 0.1% and 10% approximately. This aim is reached by using gases in the following proportions: between 2 and 10% $Cl_2$ which will react quantitatively with the overheated zirconium, between 10 and 90% $H_2$ and between 10 and 90% $CO_2$, with possible addition of a dilution gas (argon) within a 1 to 10 ratio with respect to the total flow rate of said gases. Deposition of the matrix is carried out at a temperature varying between 850° and 1100° C., preferably between 900° and 975° C. for a total pressure ranging between 0.1 and 10 kPa, preferably between 1 and 5 kPa. An analysis of the resulting products shows that part of the zirconia in the matrix is in quadratic phase, the other part being in monoclinical phase. The quantity of zirconia quadratic phase increases with the quantity of free carbon co-deposited with the zirconia. Measurements have thus showed that the fraction of zirconia in quadratic phase represents a total percentage of zirconia equal to 4%, 8% and 52% respectively, for a quantity by weight of free carbon equal to 0.75%, 2.71% and 7% respectively.

Unexpectedly, it has also been observed that the effect of the dilution of the zirconia matrix by the carbon was to raise the allotropic transformation of the zirconia matrix to high temperatures, the raising of the transformation point then reaching up to about 200° C. This improvement is accompanied by a lesser dilatometrical effect linked to the transformation which is due to the effect of dilution of zirconia by the carbon and which is particularly sensitive when the fibrous reinforcement is composed of carbon fibers, as these have a nil coefficient of expansion. Thus, in many applications, a chemical stabilization of zirconia, particularly by combination with a stabilizing oxide, is not necessary for the composite material according to the invention, which, in view of the prior art, is a significant advantage which will be appreciated by anyone skilled in the art.

Another advantage of the material according to the invention resides in a reduction of the density caused by the fibrous reinforcement. For example, compared with stabilized or unstabilized pure zirconia, whose density is between about 5.6 and 6, the composite material with zirconia matrix according to the invention has a density varying between 3.2 and 4 depending on the nature of the fiber used, on the respective volume fractions of fibers and matrix, on the residual porosity in the finally obtained composite, and on the quantity of carbon contained in the matrix. This advantage may become significant in the case of transported or moving parts.

It might also have been expected that the fact of using fibers and in particular carbon fibers, in a zirconia matrix would noticeably alter the heat-insulating and chemical inertia properties. Yet, in the presumptively very unfavorable case of a composite zirconia with a reinforcement of carbon fibers, heat conductivity at high temperatures is, at least for those composites whose reinforcement has a faintly anisotropic fibrous structure, comparable to that of fritted alumina, i.e. acceptable for a large number of applications.

Still in the case of a composite zirconia with a reinforcement of carbon fibers, a satisfactory behaviour has been observed in oxidizing atmosphere at high temperature, at least in short-lasting exposures, due to the protecting effect brought by the zirconia matrix. Obviously, when the reinforcement is formed of silicon carbide fibers, the resistance in an oxidizing atmosphere at high temperatures could not, in any case, be affected by the fibers.

The aforestated advantages show that the composite materials with zirconia matrix according to the invention, unquestionably offer, over the prior products, a variety of properties, and more particularly, improved tenacity, better preservation of the mechanical strength and dimensional stability under high temperatures, without the introduction of any fibrous reinforcement, even in carbon, reducing too excessively the properties of heat insulation and resistance to oxidation.

Examples of embodiments of composite materials with zirconia matrix according to the invention are now described, by way of illustration and non-restrictively, with reference to the accompanying drawings, in which.

EXAMPLE 1

A fibrous composite with zirconia matrix was obtained from a pseudo-tridimensional preform of carbon fibers (polyacrylonitril precursor) produced by stacking layers of a two-dimensional fabric bonded together by needling, as described in Applicant's French Patent FR 85 09 820, and strengthened with pyrolytic carbon deposited by chemical vapor infiltration by methane cracking under reduced pressure at a temperature of about 1000° C. The volume fractions of fibers and strengthening pyrolytic carbon in the preform were 20% and 10% respectively, the open porosity remaining about 70%. The preform was densified by chemical vapor infiltration with the gas mixture $ZrCl_4$-$H_2$-$CO_2$, by being placed in a hot-walled oven inside which the temperature reached 900° C. and the pressure was maintained to a value of 2 kPa by pumping, the gas mixture circulating therein at a rate of 305 cm3 per minute. The flow rates of the constituents of the mixture were 10 cm3/min. for $Cl_2$, 186 cm3/min. for $H_2$, 14 cm3/min. for $CO_2$ and 95 cm3/min. for Ar.

These conditions were selected in order to obtain a regular and homogeneous deposition of zirconia through the pores of the preform, with co-deposition of free carbon, without the pores orificices being prematurely closed. Densification was stopped when the volume fraction of zirconia in the material reached about 57%. Then there was only about 13% of the porosity still clear, which, it was deemed, did not need filling up.

Figure 1:
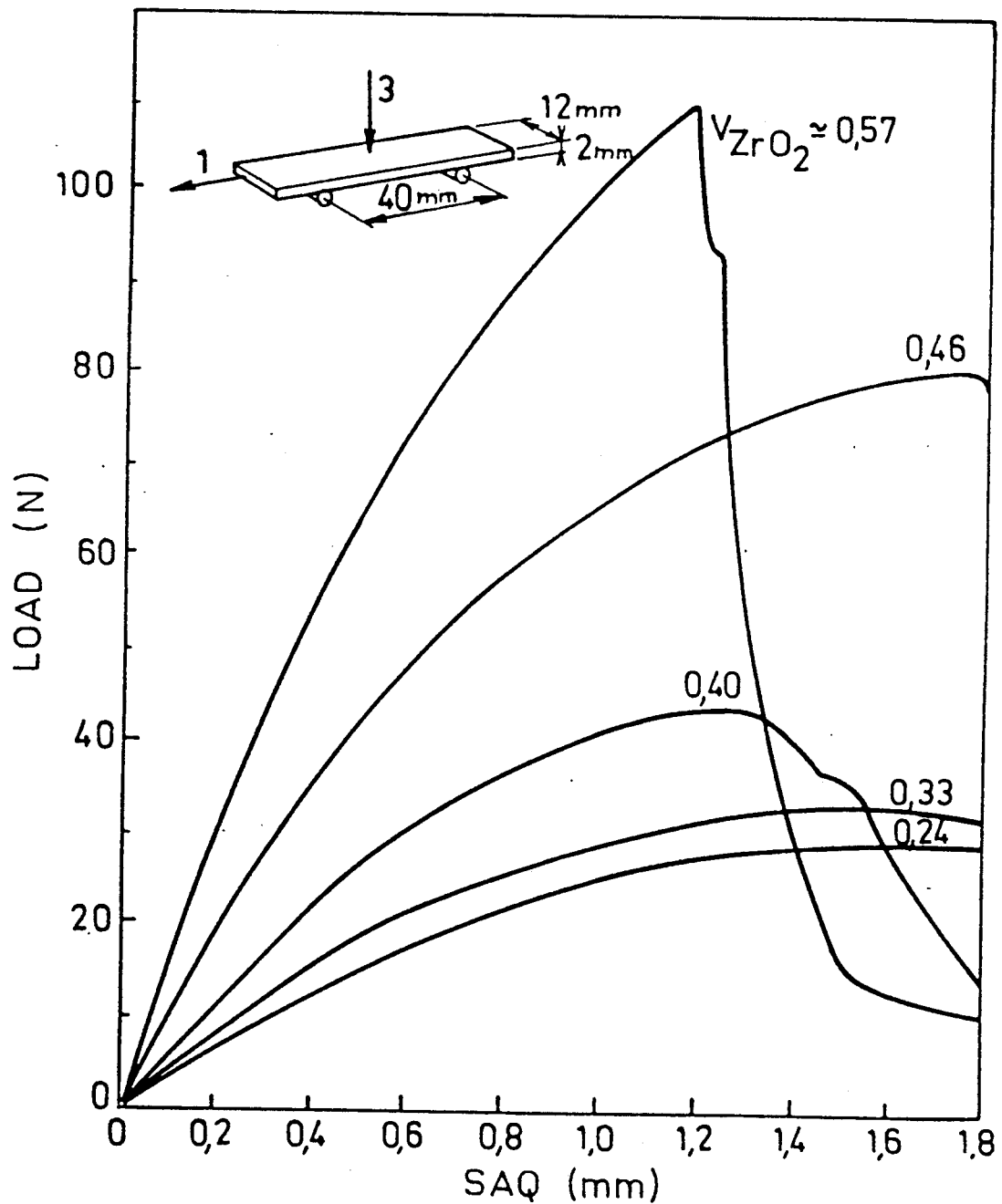
FIG. 1 shows curves illustrating the relation between load and sag, as measured during 3-points bending tests conducted on composites with zirconia matrix according to the invention for different volume fractions of the zirconia matrix.

The resulting zirconia composite was then analyzed. Its density was found to be 3.9 (against 5.9 to 6 for a non-reinforced fritted zirconia). An analysis by X-ray diffraction and Raman spectroscopy showed that the zirconia matrix had been deposited in monoclinical form and partly in quadratic form (about 4%) with very fine grain size, and that it contained a quantity of free carbon; said quantity was estimated, by chemical assay, to be about 0.75% by weight. Three-points bending tests were conducted at room temperature on the final product in the form of plates of 2 mm thickness and 12 mm width (as well as on products prepared in identical conditions, but where the densification was stopped at volume fractions of zirconia of 24, 34, 40, 46 and 57%, respectively). An examination of the load-sag curves revealed, as illustrated in FIG. 1, a solid behaviour with, significantly, a wide range of pseudo-plasticity before the fibers break and a power to withstand the load after breaking of the fibers, such characteristics being typical of tenacity by interface action, whereas the non-reinforced fritted zirconia displays a fragile behaviour when tested in identical conditions. An examination of the breaking pattern revealed an important baring of the fibers which confirmed that the fibers were only faintly bonded to the matrix owing to the deposition of pyrolytic carbon.

Figure 2:
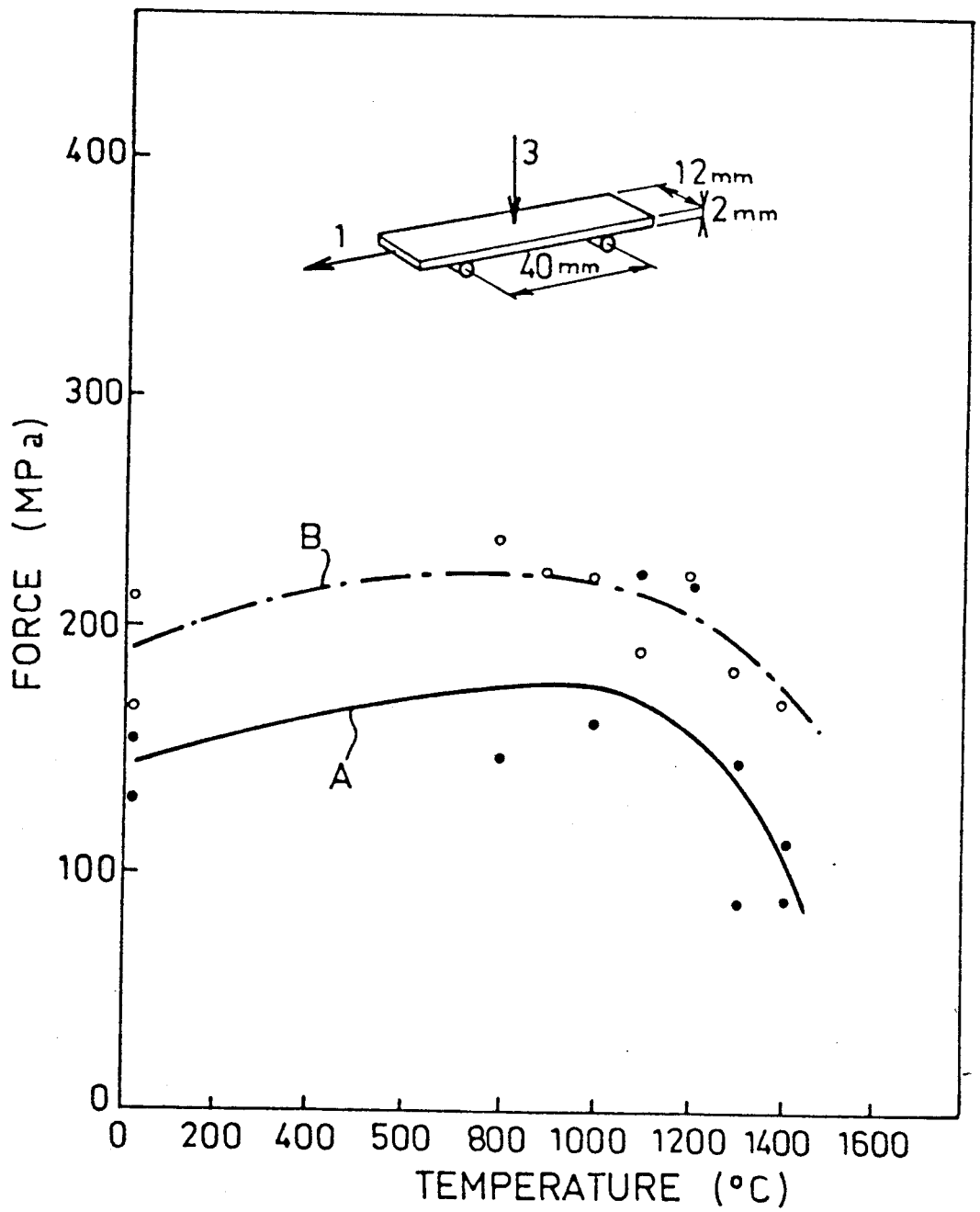
FIG. 2 shows curves illustrating the relation between breaking strength and temperature, as measured during 3-points bending tests conducted on composites with zirconia matrix according to the invention.

Bending tests were conducted repeatedly at temperatures graduating from room temperature up to 1400° C. in neutral atmosphere. It was found that, as illustrated by curve A of FIG. 2, the breaking strength is preserved, if not slightly increased, up to 900°-1000° C., i.e. the shaping temperature, and is still 85 to 75% of the value at 25° C. for a testing temperature of 1400° C. Having established that the breaking strength was preserved through a wide range of temperatures, no attempt was made to preserve the absolute values of the strength at high temperature, which could have been done by using carbon fibers of higher performance, such as the fibers T800 or T1000 marketed by the Japanese firm TORAY.

Figure 3:
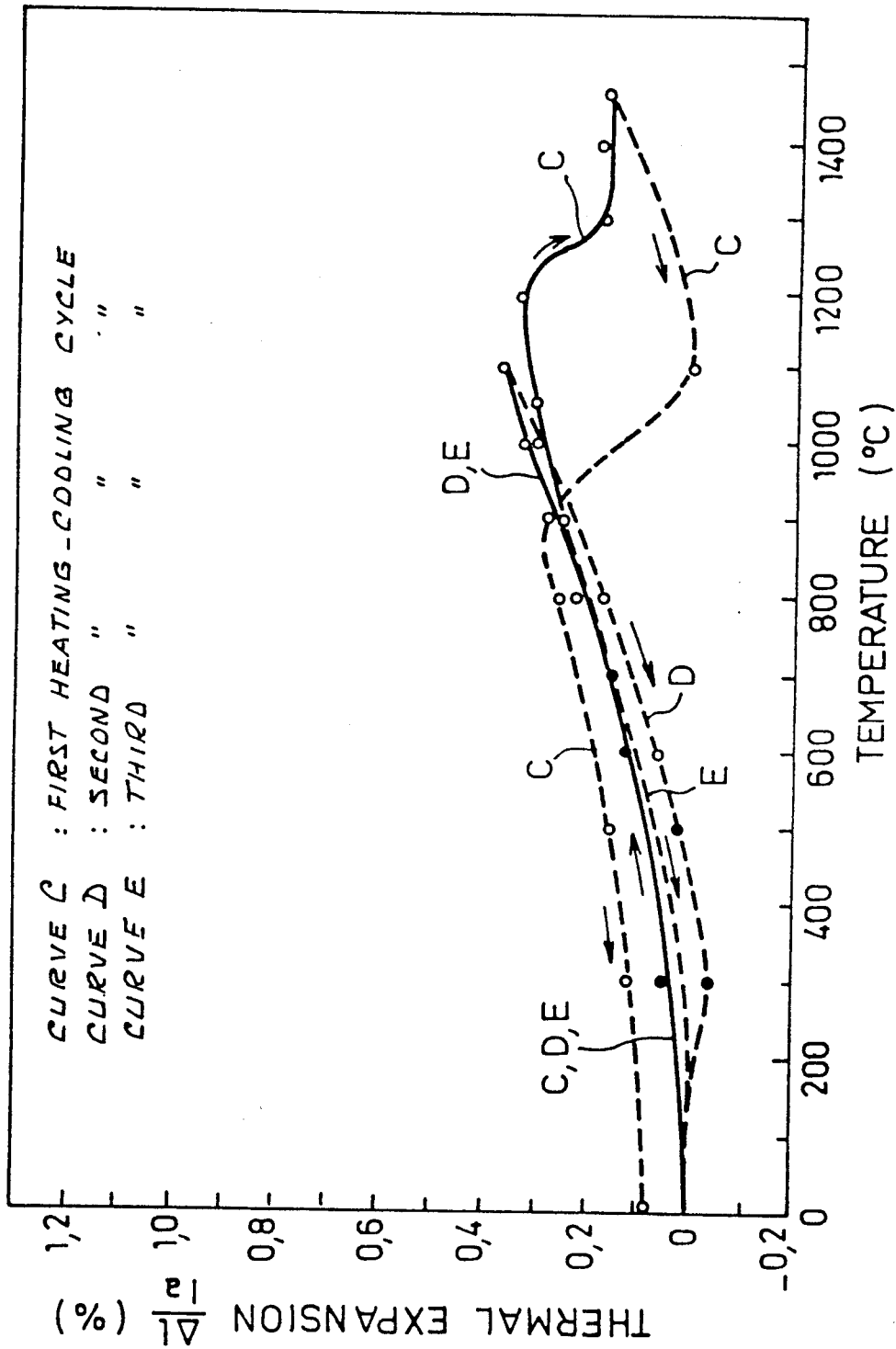
FIG. 3 shows curves illustrating the relation between heat expansion and temperature for a composite with zirconia matrix according to the invention.
Figure 4:
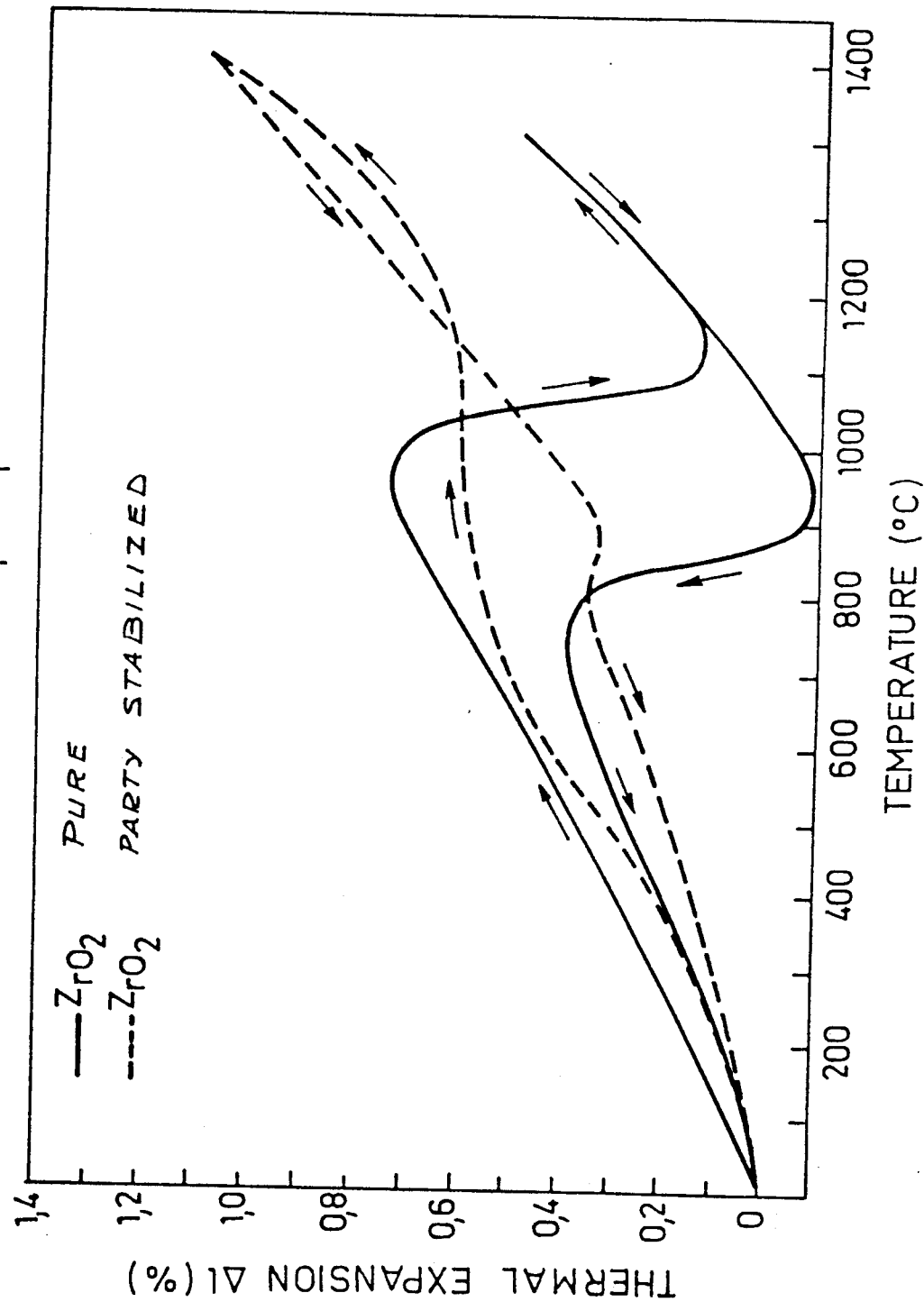
FIG. 4 shows curves illustrating comparatively the relations between thermal expansion and temperature for respectively pure and partly stabilized fritted ceramic zirconias according to the prior art.

A test piece of composite zirconia obtained as described hereinabove was put through various expansion tests by progressively increasing the maximum temperature. Curves C, D, E of FIG. 3 illustrate the expansion coefficients variations measured through three heating-cooling cycles. It was found, as illustrated in FIG. 3, that the thermal expansion had reach, at the maximum, a value of 0.35%, thereby emphasizing the excellent dimensional stability of the material according to the invention whereas the prior products had shown a maximum expansion equal to 0.7% for a pure zirconia and to 1.1% for a partly stabilized zirconia (FIG. 4). It was further observed that the allotropic transformation $ZrO_2$ (m) into $ZrO_2$ (q) of the matrix in the product according to the invention was unexpectedly retarded from about 200° C. to high temperatures and had a dilatometrical effect comparable, intensity-wise, to that characterising a partly stabilized fritted zirconia (FIG. 4). Therefore, for certain applications there is no need to chemically stabilize the zirconia in the matrix of composites according to the invention, which simplifies the shaping.

From the thermal expansion experiments conducted, it was calculated that the mean thermal expansion coefficient of composite zirconia was $3.8 \times 10^{-6}$ (°C.$^{-1}$) between 500° and 1100° C. whereas a value of $8-10 \times 10^{-6}$ (°C.$^{-1}$) is given for the partly stabilized fritted zirconias. The variation of the heat conductivity as a function of the temperature was established on the basis of the measurements of heat diffusivity and specific heat. Despite the high heat conductivity of carbon, it was found that, with a value of about 10 $Wm^{-1}K^{-1}$, the heat conductivity of the composite with zirconia matrix was situated half way between that of zirconia and that of fritted alumina, at room temperature, and close to that of alumina at 1500° C.

Finally, air oxidation tests were conducted at 1100° C. as a function of the rate of densification by zirconia of the carbon preform. It was observed that, for a sufficiently high volume fraction of zirconia, at least 30%, the volume loss through oxidation of the carbon fibers was much below 2% after four hours in the air at 1100° C. This result proves that the carbon reinforcement is protected by the zirconia matrix. By contrast, with low densification rates, i.e volume fraction of matrix equal to 10 to 20%, a very fast degradation through oxidation is observed, the fibrous reinforcement being insufficiently coated in zirconia.

EXAMPLE 2

A fibrous composite with zirconia matrix was obtained, as indicated in Example 1, but from a two directional preform composed of a stack of fabrics in carbon fibers. After consolidation with pyrolytic carbon and densification with zirconia, the resulting product was characterised by respective volume fractions of 0.30, 0.10, 0.40 and 0.20 for the carbon fibers, the pyrolytic carbon, the zirconia-free carbon matrix and the residual porosity. Density of the composite was 3.1.

The tests conducted on said composite revealed that its behaviour was comparable to that indicated for the composite according to Example 1 (see curve B of FIG. 2) with, however, with marked anisotropy deriving from the two-dimensional structure of the fibrous preform. The heat conductivity of the composite zirconia with carbon fabric reinforcement was found to be higher in a direction parallel to the plane of the carbon fabrics than in a perpendicular direction, the respective values being 18 and 7 $Wm^{-1}K^{-1}$. The values of the mean coefficient of thermal expansion measured in a direction parallel to the plane of the carbon fabrics were between $5.10^{-6}$ and $5.5.10^{-6}$ (°C.$^{-1}$) between 500° and 1100° C.

This example shows that it is possible, by introducing the appropriate fibrous reinforcement, to obtain composite zirconias according to the invention having mechanical and anisotropic thermal properties, with possibility of controlling the degree of anisotropy, a property which is unattainable with a polycrystalline fritted zirconia.

We claim:

1. Composite material with zirconia matrix comprising a fibrous reinforcement and a matrix deposited by chemical vapor infiltration through the porosity of the reinforcement, wherein the reinforcement is constituted by a fibrous fabric in fibers selected from carbon fibers and silicon carbide fibers, the matrix containing free carbon co-deposited with the zirconia.

2. Material as claimed in claim 1, wherein the weight proportion of free carbon co-deposited with the zirconia in the matrix is between 0.1% and 10%.

3. Material as claimed in claim 1, wherein the fibers are coated with an intermediate layer of a material which is elastically deformable at least under shear stress, which has a breaking elongation higher than that of zirconia and which adheres to the fibers and to the matrix in such a way as to form between them a bonding layer with elastic properties at least under shear stress.

4. Material as claimed in claim 3, wherein the intermediate layer is in a material selected from laminar pyrolytic carbon and boron nitride.

* * * * *